(12) United States Patent
Kumagai et al.

(10) Patent No.: US 7,878,534 B2
(45) Date of Patent: Feb. 1, 2011

(54) PASSENGER AIRBAG APPARATUS

(75) Inventors: Masayoshi Kumagai, Tokyo (JP); Yasuhito Miyata, Tokyo (JP)

(73) Assignee: Takata Corporation, Tokyo (JP)

( * ) Notice: Subject to any disclaimer, the term of this patent is extended or adjusted under 35 U.S.C. 154(b) by 60 days.

(21) Appl. No.: 12/320,723

(22) Filed: Feb. 3, 2009

(65) Prior Publication Data

US 2009/0295136 A1 Dec. 3, 2009

(30) Foreign Application Priority Data

May 30, 2008 (JP) .............................. 2008-143016

(51) Int. Cl.
*B60R 21/20* (2006.01)
*B60R 21/205* (2006.01)

(52) U.S. Cl. ..................... 280/732; 280/731; 280/743.1; 280/743.2

(58) Field of Classification Search ................. 280/731, 280/732, 743.1, 743.2
See application file for complete search history.

(56) References Cited

U.S. PATENT DOCUMENTS

| | | | | |
|---|---|---|---|---|
| 5,588,674 A * | 12/1996 | Yoshimura et al. | ........... | 280/732 |
| 5,997,037 A * | 12/1999 | Hill et al. | .................. | 280/743.2 |
| 6,070,904 A * | 6/2000 | Ozaki et al. | .............. | 280/743.1 |
| 6,131,944 A * | 10/2000 | Henkel et al. | ............. | 280/728.3 |
| 6,371,510 B1 * | 4/2002 | Marriott et al. | .......... | 280/730.1 |
| 6,474,686 B1 * | 11/2002 | Higuchi et al. | ............ | 280/743.1 |
| 6,877,772 B2 | 4/2005 | Fischer et al. | | |
| 6,955,377 B2 * | 10/2005 | Cooper et al. | ............ | 280/743.1 |
| 7,152,879 B2 * | 12/2006 | Kai | .......................... | 280/743.2 |
| 7,396,044 B2 * | 7/2008 | Bauer et al. | .............. | 280/743.2 |
| 2005/0212275 A1 * | 9/2005 | Hasebe | ..................... | 280/743.1 |
| 2007/0246924 A1 * | 10/2007 | Eckelberg | ................. | 280/743.2 |
| 2008/0217892 A1 * | 9/2008 | Maripudi et al. | ............ | 280/740 |
| 2009/0152842 A1 * | 6/2009 | Benny et al. | ............. | 280/728.3 |
| 2009/0295135 A1 * | 12/2009 | Kumagai et al. | ......... | 280/743.1 |

FOREIGN PATENT DOCUMENTS

| | | | | |
|---|---|---|---|---|
| JP | H08-108816 A | | 4/1996 |
| JP | 2000-247199 A | | 9/2000 |
| JP | 2001301555 A | * | 10/2001 |
| JP | 2001-334900 A | | 12/2001 |

\* cited by examiner

*Primary Examiner*—Faye M. Fleming
*Assistant Examiner*—James English
(74) *Attorney, Agent, or Firm*—Manabu Kanesaka

(57) ABSTRACT

A passenger airbag apparatus for a vehicle includes a retainer, an airbag folded and retained in the retainer, a deployment-limiting sheet, and a shape-retaining sheet. The deployment-limiting sheet has one end coupled to the retainer or the rear portion of the airbag, and extends toward the front portion of the airbag while being superposed on the airbag. The deployment-limiting sheet has a first folded part and extends along the rear portion of the airbag during inflation of the airbag. The first shape-retaining sheet is coupled to the retainer or the deployment-limiting sheet for retaining a shape of the folded airbag and a shape of the deployment-limiting sheet. The first shape-retaining sheet has a shape-retainment release portion for releasing a shape of the folded airbag by inflation of the airbag.

11 Claims, 14 Drawing Sheets

PASSENGER AIRBAG APPARATUS

BACKGROUND OF THE INVENTION AND RELATED ART STATEMENT

The present invention relates to passenger airbag apparatuses for automobiles, and more particularly to a passenger airbag apparatus including a deployment-limiting sheet that limits the form of an airbag during inflation.

An exemplary passenger airbag apparatus includes a retainer arranged inside a dashboard, a folded airbag arranged in the retainer, an inflator configured to inflate the airbag, and a lid configured to lid the retainer.

Japanese Patent No. 3406277 (Patent Document 1) discloses in paragraph 0002 that, when an airbag is deployed into a cabin by gas generated from an inflator in the event of a collision of a vehicle, an airbag having a small volume in an initial deployment phase is rapidly inflated, whereas an airbag having a large volume in an initial deployment phase is gradually inflated. The airbag tears a fragile portion of a lid during the inflation and is deployed into the cabin. Hence, a protruding speed of the airbag into the cabin immediately after the lid is torn can become high.

In the Patent Document 1, a strip-shaped deployment-limiting sheet having a predetermined length is provided between the folded airbag and an inner surface of the lid. One end of the deployment-limiting sheet is fixed to a rear edge of a retainer, and the other end thereof extends along the folded airbag from a rear portion to a front portion of the airbag.

When the airbag is inflated, the deployment-limiting sheet extends along the rear portion of the airbag during the inflation, wherein one end of the deployment-limiting sheet is coupled to the rear edge of the retainer and the other end thereof is a free end. Friction is generated between the deployment-limiting sheet and the rear portion of the airbag. Due to the friction, a front portion of the airbag is deployed first, and the rear portion of the airbag is deployed next.

Japanese Unexamined Patent Application Publication No. 2000-247199 (Patent Document 2) discloses a loop-like deployment-limiting sheet, which extends from a rear side through an upper side to a front side of an airbag, and both ends in a front-rear direction of the deployment-limiting sheet are coupled to a retainer. In the deployment-limiting sheet disclosed in the Patent Document 2, a sewing portion is formed by sewing intermediate portions near one end and the other end with respect to the center in the longitudinal direction of the deployment-limiting sheet. Also, a tear line extending across the deployment-limiting sheet is formed at a portion near the center with respect to the sewing portions in the longitudinal direction of the deployment-limiting sheet.

In the Patent Document 2, the sewing portion temporarily limits deployment of the airbag in an initial deployment phase of the airbag. When the sewing portion is torn by an inflation pressure of the airbag, the airbag is inflated until the deployment-limiting sheet achieves a maximum deployment form. At this time, a deployment force of the airbag is consumed by tearing the sewing portion. Accordingly, a deployment speed of the airbag to an occupant is decreased.

When the inflation of the airbag is in a condition where the deployment-limiting sheet achieves the maximum deployment form, the deployment-limiting sheet temporarily restrains further inflation of the airbag. Thereafter, the deployment-limiting sheet is torn at the tear line by the inflation pressure of the airbag, the inflation of the airbag further progresses from the torn part of the tear line, and the airbag achieves a maximum inflation form.

In the Patent Documents 1 and 2, when the airbag is not inflated, the deployment-limiting sheet is interposed between the folded airbag and the lid while the deployment-limiting sheet is folded.

However, according to the Patent Documents 1 and 2, since the deployment-limiting sheet is merely folded and arranged between the folded airbag and the lid, the deployment-limiting sheet may likely be unfolded or deviated from its expected position.

An object of the present invention is, in a passenger airbag apparatus including a deployment-limiting sheet, to provide an airbag apparatus capable of retaining a folded deployment-limiting sheet in a predetermined condition before the inflation.

Further objects and advantages of the invention will be apparent from the following description of the invention.

SUMMARY OF THE INVENTION

A passenger airbag apparatus of a first aspect of the invention includes a retainer arranged inside a dashboard; a folded airbag arranged in the retainer; an inflator configured to inflate the airbag; a lid configured to cover the retainer; and a deployment-limiting sheet. One end of the deployment-limiting sheet is coupled to the retainer or a rear portion of the airbag, and the deployment-limiting sheet extends toward a front portion of the airbag while being superposed on the folded airbag. Also, the deployment-limiting sheet is interposed between the folded airbag and the lid while a part of the deployment-limiting sheet is folded, the deployment-limiting sheet extending along the rear portion of the airbag when the airbag is being inflated. In the passenger airbag apparatus, a shape-retaining sheet is coupled to the retainer or the deployment-limiting sheet, the shape-retaining sheet being configured to retain the shape of the folded airbag and the shape of the folded deployment-limiting sheet. Also, the shape-retaining sheet includes a shape-retainment release portion configured to release the shape retainment by an inflation pressure of the airbag.

With respect to a passenger airbag apparatus of a second aspect of the invention, in view of the first aspect, the shape-retainment release portion is an expected tear portion allowing the shape-retaining sheet to be torn when a tensile force applied to the shape-retaining sheet becomes a predetermined value or higher.

With respect to a passenger airbag apparatus according to a third aspect of the invention, in view of the first or second aspect, one end of the shape-retaining sheet is coupled to the deployment-limiting sheet, and the other end of the shape-retaining sheet is connected to a front portion of the retainer.

As to a passenger airbag apparatus of a fourth aspect of the invention, in view of any one of the first to third aspects, the other end of the deployment-limiting sheet is coupled to the front portion of the retainer. An expected tear portion is provided at a position near the other end of the deployment-limiting sheet, the expected tear portion allowing the deployment-limiting sheet to be torn by a tensile force at the deployment-limiting sheet after the deployment-limiting sheet achieves a maximum deployment form.

A passenger airbag apparatus of a fifth aspect of the invention, in view of any one of the first to fourth aspects, further includes a second deployment-limiting sheet having a base end coupled to a rear portion of the retainer or the deployment-limiting sheet, and a tip end tucked into the folded airbag.

The passenger airbag apparatus of the present invention includes the deployment-limiting sheet extending along the rear portion of the airbag during the inflation. Before the inflation of the airbag, the deployment-limiting sheet is folded and interposed between the folded airbag and the lid. In the present invention, the shape-retaining sheet for retaining a shape of the folded airbag and a shape of the folded deployment-limiting sheet is provided. Therefore, the shape-retaining sheet can retain the shape of the folded deployment-limiting sheet in a predetermined condition (folding form and position) before the inflation of the airbag. Accordingly, the folded deployment-limiting sheet can be prevented from varying in deployment form, as a result of being unfolded or deviated from its expected position, or such variation can be decreased.

When the airbag starts to be inflated, an inflation pressure of the airbag is applied to the shape-retaining sheet, and hence, the shape-retainment release portion releases the shape retainment, i.e. allowing the airbag to expand freely. Since the shape-retaining sheet retains the shape of the airbag until the shape-retaining sheet releases the shape retainment, a protruding speed of the airbag from the retainer in an initial inflation phase is decreased.

In the passenger airbag apparatus of the second aspect, a tensile force is produced at the shape-retaining sheet by the inflation pressure of the airbag applied to the shape-retaining sheet. When the tensile force becomes a predetermined value or higher, the shape-retaining sheet is torn and the shape retainment is released. An inflation force of the airbag is partly consumed by tearing the shape-retaining sheet. Accordingly, the inflation speed of the airbag in the initial inflation phase of the airbag is decreased.

As depicted in the third aspect, the one end of the shape-retaining sheet is coupled to the deployment-limiting sheet. Accordingly, the length of the shape-retaining sheet may be decreased as compared with a case in which the one end of the shape-retaining sheet is directly coupled to the retainer. Accordingly, decreasing the length of the shape-retaining sheet can promote reduction in material cost of the sheet, reduction in package volume, reduction in weight of the passenger airbag apparatus, etc.

In the passenger airbag apparatus of the forth aspect, the deployment-limiting sheet temporarily restrains further inflation of the airbag when the inflation of the airbag reaches a condition where the deployment-limiting sheet achieves a maximum deployment form. When the tensile force produced at the deployment-limiting sheet by the inflation pressure of the airbag reaches a threshold of the expected tear portion, the expected tear portion is torn, and the airbag is further inflated. The restraint and tearing of the deployment-limiting sheet decreases an initial inflation speed of the airbag is decreased.

Also, the deployment-limiting sheet is torn at the expected tear portion after the deployment-limiting sheet achieves the maximum deployment form in which the sufficient tensile force is produced at the expected tear portion. A remaining piece of the deployment-limiting sheet produced when the deployment-limiting sheet is torn after the deployment-limiting sheet achieves the maximum deployment form is configured such that one end of the remaining piece is coupled to the retainer and the other end thereof is a free end. In a later inflation phase of the airbag, the remaining piece extends along the rear portion of the airbag, thereby providing a similar function to that of the original deployment-limiting sheet.

The deployment-limiting sheet immediately before tearing has the maximum deployment form. The remaining piece of the deployment-limiting sheet produced by tearing has a predetermined shape according to the maximum deployment form.

In the passenger airbag apparatus of the fifth aspect, the second deployment-limiting sheet decreases the initial inflation speed of the airbag. In particular, the base end of the second deployment-limiting sheet is coupled to the retainer or the deployment-limiting sheet, and the tip end thereof is tucked into the airbag. Accordingly, when the folded airbag is to be inflated, friction is produced between a tip end of the second deployment-limiting sheet and the folded airbag. The friction decreases the inflation speed of the airbag.

DETAILED DESCRIPTION OF PREFERRED EMBODIMENTS

Embodiments of the present invention are described below with reference to the drawings.

Figure 1:
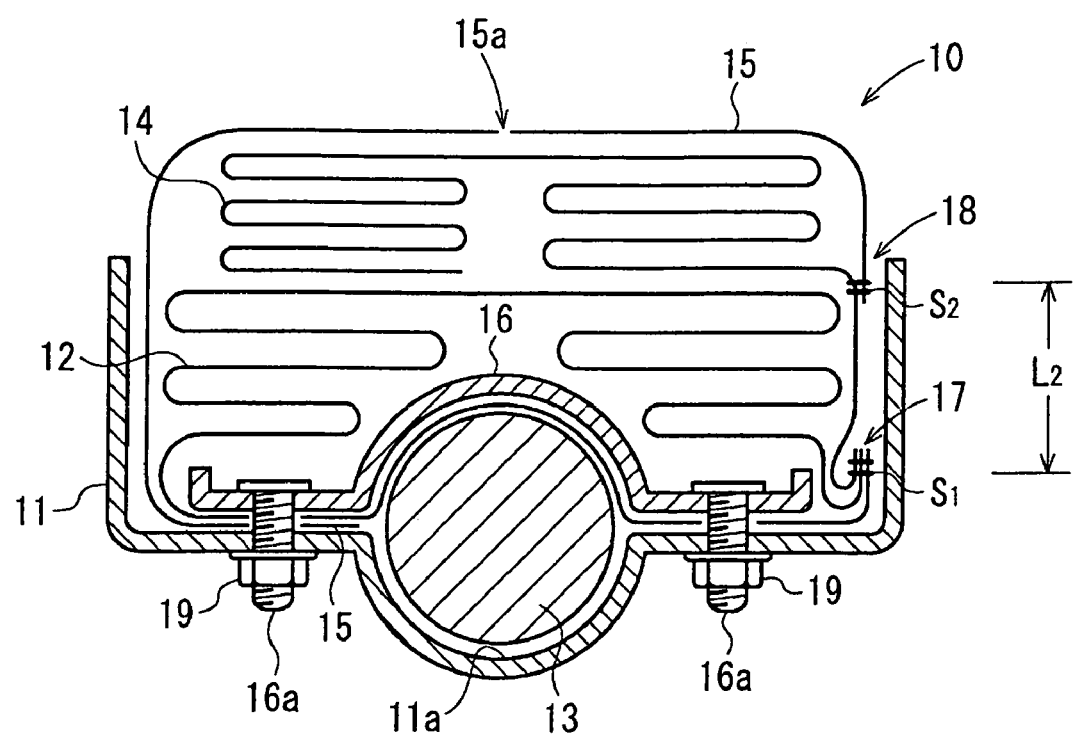
FIG. 1 is a longitudinal sectional view schematically showing a passenger airbag apparatus according to an embodiment.
Figure 2:
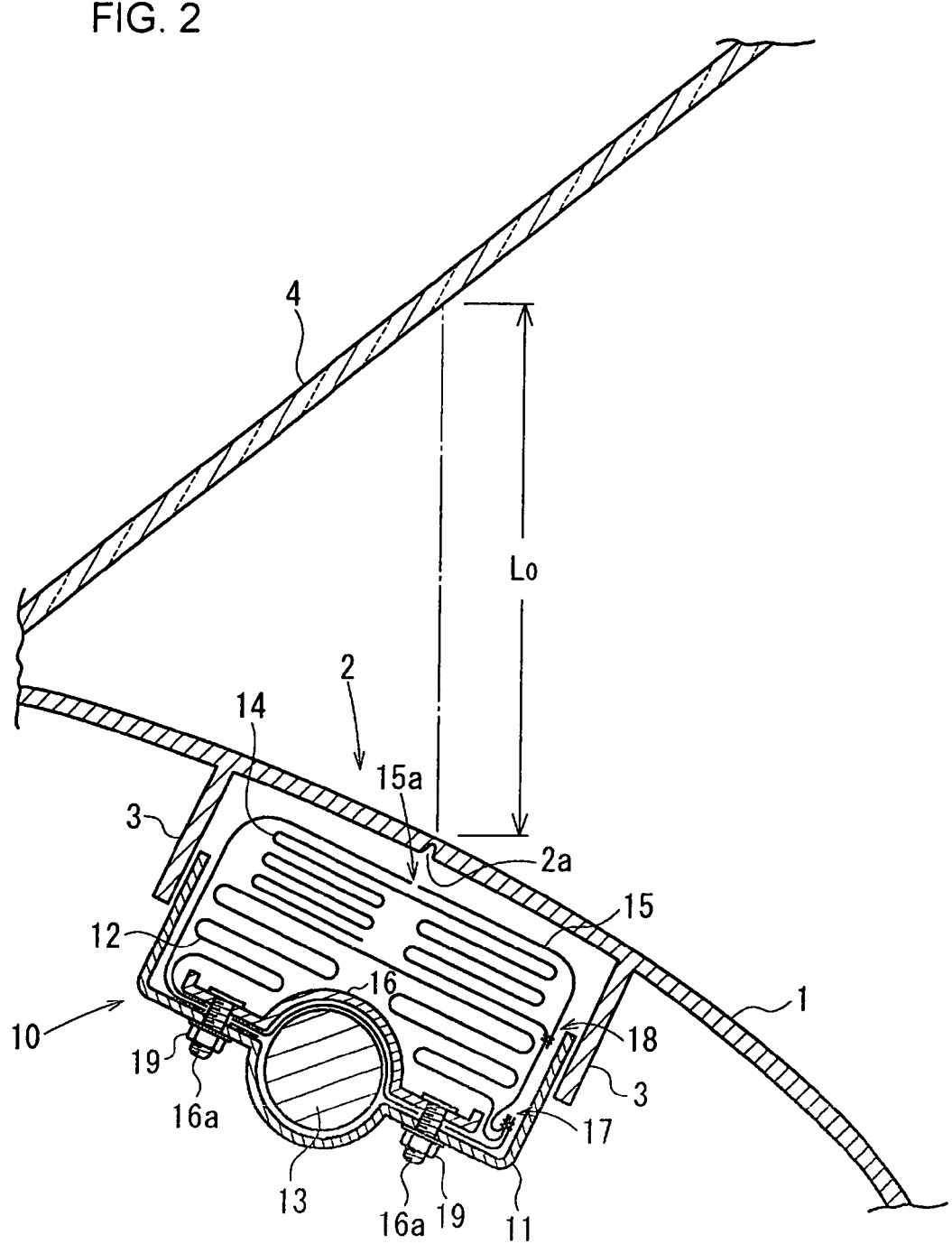
FIG. 2 is a longitudinal sectional view showing an area around an upper portion of a dashboard in a cabin, in which the passenger airbag apparatus in FIG. 1 is disposed.
Figure 3:
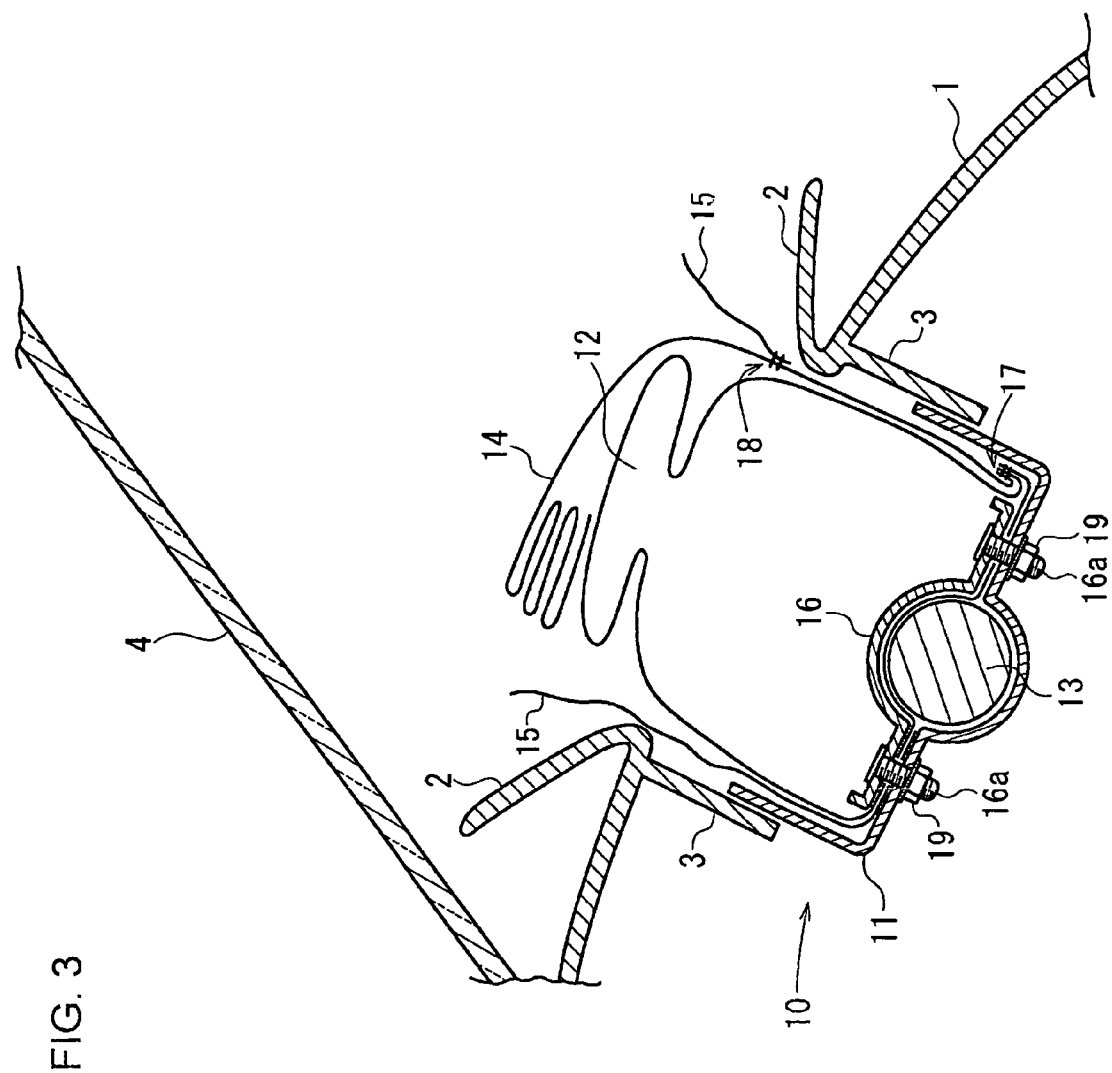
FIG. 3 is a longitudinal sectional view showing the area around the upper portion of the dashboard in the cabin, in which the passenger airbag apparatus in FIG. 1 is disposed.
Figure 4:
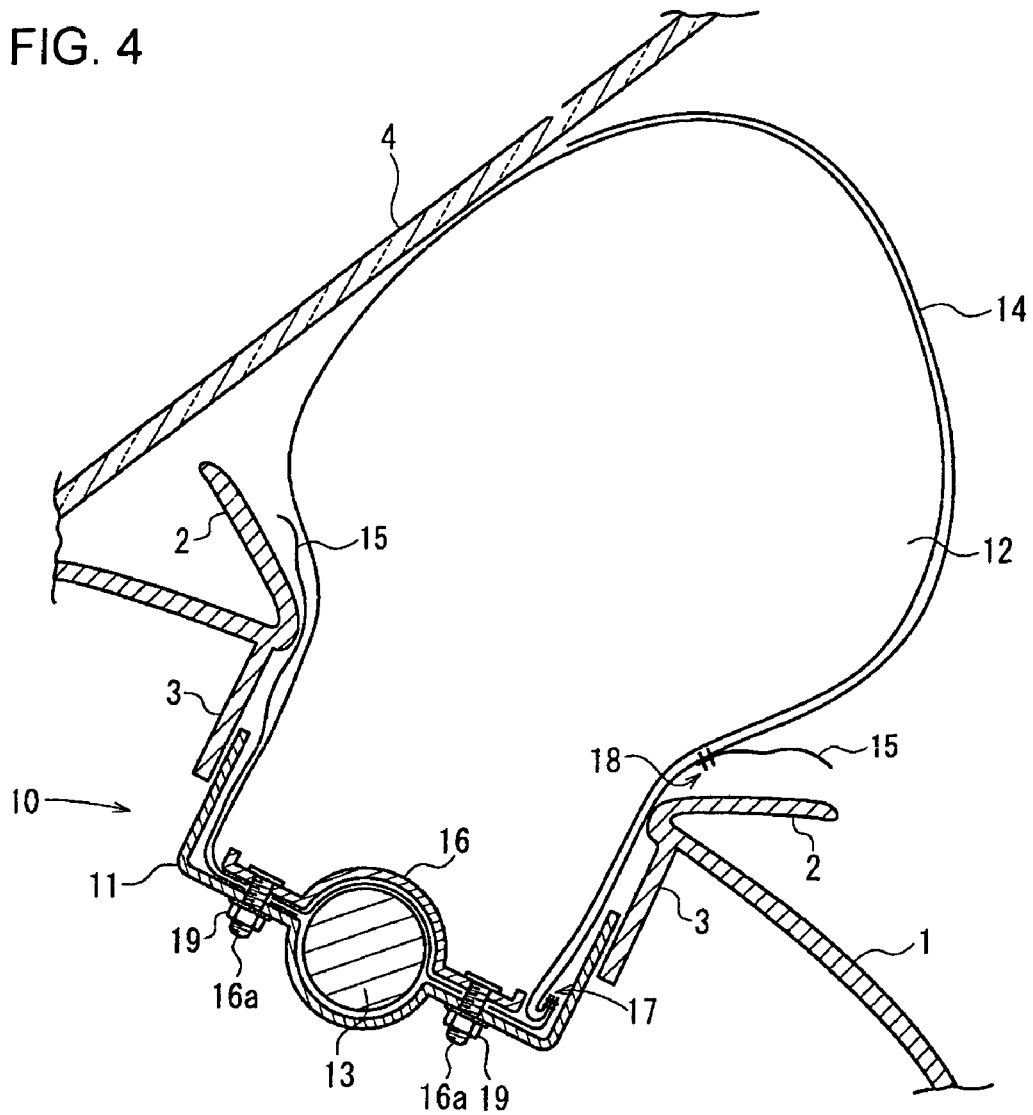
FIG. 4 is a longitudinal sectional view showing the area around the upper portion of the dashboard in the cabin, in which the passenger airbag apparatus in FIG. 1 is disposed.
Figure 5:
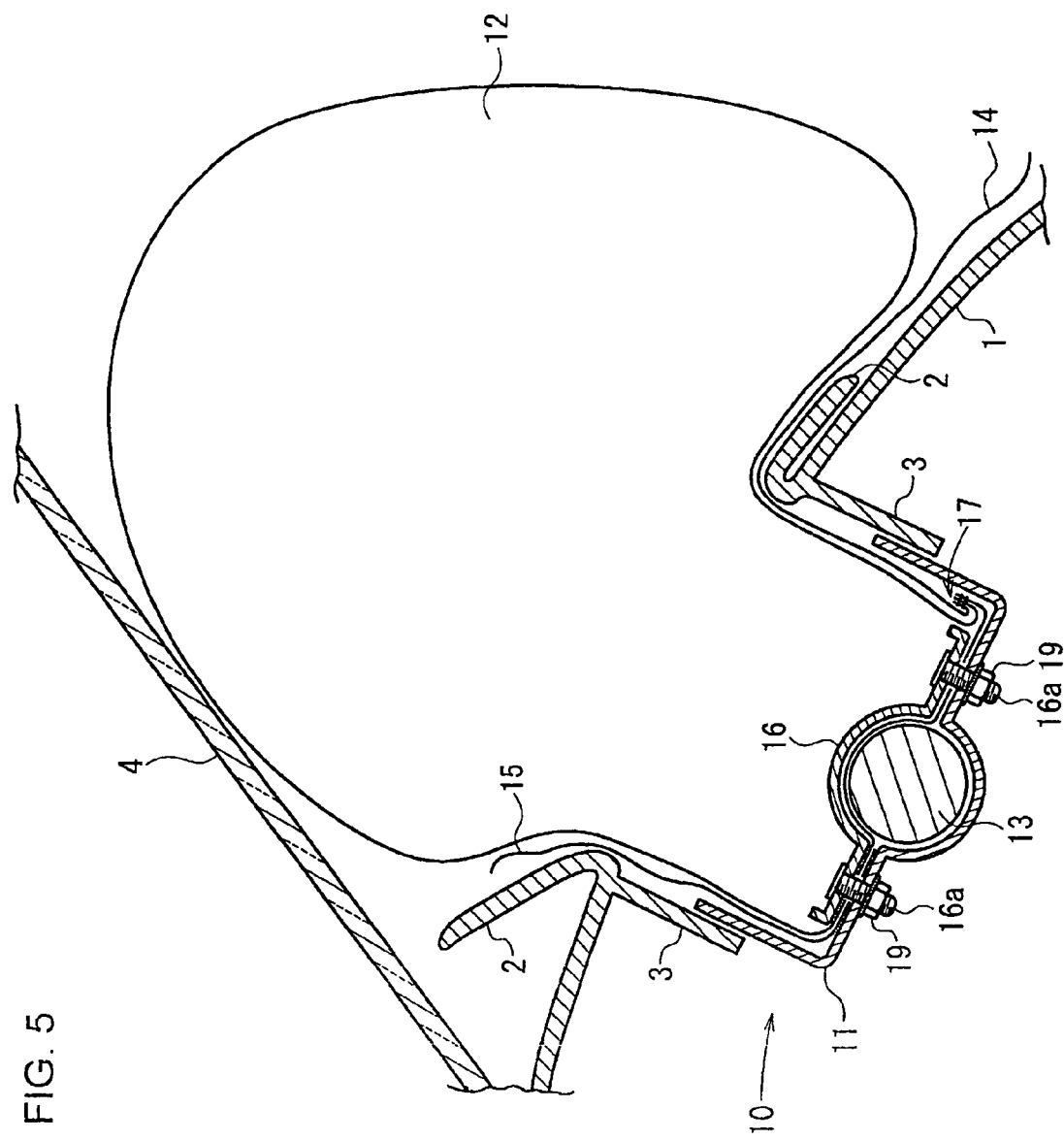
FIG. 5 is a longitudinal sectional view showing the area around the upper portion of the dashboard in the cabin, in which the passenger airbag apparatus in FIG. 1 is disposed.

FIG. 1 is a longitudinal sectional view schematically showing a passenger airbag apparatus according to an embodiment. FIGS. 2 to 5 are longitudinal sectional views, each showing an area around an upper portion of a dashboard in a cabin, in which the passenger airbag apparatus is disposed. FIG. 2 shows a condition before inflation of an airbag, FIG. 3 shows an initial inflation condition of the airbag immediately after a shape-retaining sheet is torn, FIG. 4 shows a condition in which a deployment-limiting sheet limits deployment of the airbag during the inflation, and FIG. 5 shows a condition in which the inflation of the airbag is completed.

Hereinafter, a front and rear direction in the description corresponds to a front and rear direction of a vehicle body to which the passenger airbag apparatus is mounted.

A passenger airbag apparatus 10 includes a retainer 11, which is a top-open container arranged inside a dashboard 1 in front of a passenger seat of an automobile; a folded airbag 12 arranged in the retainer 11; an inflator 13 configured to inflate the airbag 12; a deployment-limiting sheet 14 configured to limit deployment of a rear portion of the airbag 12 during inflation of the airbag 12; and a shape-retaining sheet 15 configured to retain the shape of the folded airbag 12.

As shown in FIG. 2, in this embodiment, a portion of a top panel of the dashboard 1 covering the retainer 11 defines a door 2 configured to be cleaved by an inflation pressure of the airbag 12 and open to a cabin when the airbag 12 is inflated. Reference character 2a denotes a tear line formed of a groove. The tear line 2a induces the cleavage of the door 2. That is, in this embodiment, the door 2 corresponds to a lid configured to lid the retainer 11. The lid is integral with the dashboard 1. In the present invention, alternatively, the lid may be provided separately from the dashboard 1.

A peripheral-wall-like leg piece 3 vertically extends from the periphery of the door 2 toward the lower side. The retainer 11 is arranged to be fitted into the leg piece 3. The retainer 11 is engaged with the leg piece 3 by a hook (not shown) or the like.

As shown in FIG. 5, an inflation form of the airbag 12 is as follows. The airbag 12 pushes and opens the door 2, starts to be inflated into the cabin, and is deployed such that a front portion of the airbag 12 fills a space between the top panel of the dashboard 1 and a windshield 4 and that a rear portion of the airbag 12 is inflated to rear and lower sides and fills a space in front of the passenger seat.

A gas inlet (not shown) is provided at a lower surface of a front end portion of the airbag 12 (hereinafter, also referred to as a base-end portion of the airbag 12) in an inflated state. A peripheral edge of the gas inlet and the inflator 13 are coupled to a bottom surface of the retainer 11 by a pressing plate 16.

In this embodiment, the inflator 13 is a column, and is arranged in the retainer 11 while an axial direction of the inflator 13 is aligned with a vehicle-body-width direction. A substantially semi-cylindrical recess 11a is provided at the bottom surface of the retainer 11. A substantially lower half portion of the inflator 13 is fitted into the recess 11a.

The pressing plate 16 includes a pair of substantially C-shaped band portions (reference numeral omitted) covering an outer peripheral surface of the inflator 13 at both ends in the axial direction of the inflator 13 from above; flange portions (reference numeral omitted) coupling both ends of the band portions and extending from both ends of the band portions along the bottom surface of the retainer 11 toward the front and rear sides; and stud bolts 16a protruding from the flange portions toward the lower side. A front edge portion and a rear edge portion of the gas inlet at the airbag 12 have bolt insertion holes (reference numeral omitted) through which the stud bolts 16a are respectively inserted.

The deployment-limiting sheet 14 is formed of a strip-shaped sheet having a predetermined length. In this embodiment, one end (hereinafter, also referred to as base end) of the deployment-limiting sheet 14 is coupled to a rear portion of the base-end portion of the airbag 12. The coupling position of the deployment-limiting sheet 14 to the airbag 12 may be preferably located at a distance of at least 300 mm, and more particularly, in a range from 400 to 550 mm, from the bottom surface of the retainer 11 along an outer surface of the airbag 12 in the inflated state of the airbag 12. In the present invention, the one end of the deployment-limiting sheet 14 may be coupled to the bottom surface of the retainer 11 or a rear portion of the peripheral wall.

The airbag 12 is formed into a bag by sawing base fabrics. In this embodiment, a sewing portion 17, which sews the base fabrics together, is arranged at a position at a slightly rear side with respect to the gas inlet of the airbag 12. Reference character $S_1$ in FIG. 1 denotes a seam formed of, for example, a sewing thread sewing the base fabrics together. The sewing portion 17 extends in the vehicle-body-width direction.

In this embodiment, when the airbag 12 is to be sewed, one end of the deployment-limiting sheet 14 is superposed on the base fabrics of the sewing portion 17, and sewed with the seam $S_1$ together with the base fabrics. Thus, the deployment-limiting sheet 14 is coupled to the airbag 12. It is to be noted that the coupling method of the deployment-limiting sheet 14 to the airbag 12 is not limited thereto.

In this embodiment, the other end (hereinafter, also referred to as tip end) of the deployment-limiting sheet 14 is a free end.

A length $L_1$ (not shown) of the deployment-limiting sheet 14 from a coupling portion (sewing portion 17) of the deployment-limiting sheet 14 with the airbag 12 to the other end is greater than a distance $L_0$ (FIG. 2) from a substantially center position of the door 2 in the front-rear direction of the vehicle body to the windshield 4 located vertically above the substantially center position.

The overall width of the deployment-limiting sheet 14 may be preferably at least 100 mm, and more particularly, in a range from 160 to 300 mm. In this embodiment, the width of the deployment-limiting sheet 14 is substantially equivalent to the width of the folded airbag 12 in the vehicle-body-width direction.

In this embodiment, the shape-retaining sheet 15 is also formed of a strip-shaped sheet.

In this embodiment, the shape-retaining sheet 15 is arranged opposite to the airbag 12 with respect to the deployment-limiting sheet 14, the longitudinal direction of the shape-retaining sheet 15 being substantially parallel to the deployment-limiting sheet 14. One end (hereinafter, also referred to as a base end) of the shape-retaining sheet 15 is coupled to an intermediate portion in the longitudinal direction of the deployment-limiting sheet 14. Reference numeral 18 denotes a coupling portion at the one end of the shape-retaining sheet 15 to the deployment-limiting sheet 14. In this embodiment, the one end of the shape-retaining sheet 15 is sewed to the deployment-limiting sheet 14 with a seam $S_2$ (FIG. 1) formed of, for example, a sewing thread. The seam $S_2$ has such strength that the seam $S_2$ is not torn even if a predetermined value or higher of the tensile force is applied to the shape-retaining sheet 15. It is to be noted that the coupling method of the shape-retaining sheet 15 to the deployment-limiting sheet 14 is not limited thereto.

In this embodiment, the one end of the shape-retaining sheet 15 is coupled to a rear portion of the base-end portion of the airbag 12 via the deployment-limiting sheet 14. In the present invention, a distance $L_2$ (FIG. 1) from the sewing portion 17, which couples the deployment-limiting sheet 14 to the airbag 12, to the coupling portion 18, which couples the shape-retaining sheet 15 to the deployment-limiting sheet 14, may be preferably in a range from 10 to 110 mm, and more particularly, in a range from 20 to 60 mm.

Since the one end of the shape-retaining sheet 15 is coupled to the intermediate portion of the deployment-limiting sheet 14, the length of the shape-retaining sheet 15 is decreased by at least the distance $L_2$, as compared with a case where the one end of the shape-retaining sheet 15 is directly coupled to the base-end portion of the airbag 12 or the retainer 11. Accordingly, decreasing the length of the shape-retaining sheet 15 can promote reduction in material cost of the shape-retaining sheet 15, reduction in package volume of the folded airbag 12, reduction in weight of the passenger airbag apparatus 10, etc.

In this embodiment, an expected tear portion 15a serving as a shape-retainment release portion is provided at a middle portion in the longitudinal direction of the shape-retaining sheet 15. In this embodiment, the expected tear portion 15a is a slit with perforations extending across the shape-retaining sheet 15 in the width direction. The shape-retaining sheet 15 is torn along the expected tear portion 15a when a predetermined value or higher of the tensile force is applied to the shape-retaining sheet 15 in the longitudinal direction. The shape-retaining sheet 15 is separated into one end portion and the other end portion at the expected tear portion 15a, thereby releasing the shape retainment (folded shape of the airbag).

It is to be noted that the structure of the expected tear portion of the shape-retaining sheet 15 is not limited thereto. For example, instead of providing the slit with perforations as the expected tear portion in the shape-retaining sheet 15, the seam $S_2$, which couples the shape-retaining sheet 15 to the deployment-limiting sheet 14, may serve as a seam with a low strength (so called tear seam) that is torn by a predetermined value or higher of the tensile force. Accordingly, when the predetermined value or higher of the tensile force is applied to the shape-retaining sheet 15, the seam $S_2$ is torn and the shape-retaining sheet 15 is separated from the deployment-limiting sheet 14, thereby releasing the shape retainment.

The other end (hereinafter, also referred to as a tip end) of the shape-retaining sheet 15 has a bolt insertion hole (reference numeral omitted) through which the stud bolt 16a of the pressing plate 16 is inserted.

A procedure from the folding to the shape retainment of the airbag 12 is described below.

In this embodiment, before the airbag 12 is folded, the pressing plate 16 is arranged in the airbag 12 via the gas inlet of the airbag 12. The stud bolts 16a of the pressing plate 16 are inserted through the bolt insertion holes of the airbag 12 to extend out the airbag 12, and the flange portions of the pressing plate 16 are superposed on the peripheral edge of the gas inlet.

Then, as shown in FIG. 1, the airbag 12 is folded into a block form, and is mounted on the pressing plate 16. In this embodiment, as shown in FIG. 1, while the airbag 12 is folded in a zigzag (concertina-like) manner, the airbag 12 may be folded by a folding method other than the zigzag folding. For example, the airbag 12 may be rolled. Alternatively, the airbag 12 may be folded by a combination of a plurality of folding methods.

Then, as shown in FIG. 1, the deployment-limiting sheet 14 is drawn to the upper side along the rear portion of the folded airbag 12 and then is drawn to the front side along an upper side of the folded airbag 12. A portion of the deployment-limiting sheet 14 drawn to the upper side of the folded airbag 12 is folded into a block form, and is mounted on the folded airbag 12.

In this embodiment, the coupling portion 18, which couples the shape-retaining sheet 15 to the deployment-limiting sheet 14, is located near an upper end of the portion of the deployment-limiting sheet 14 drawn to the upper side along the rear portion of the folded airbag 12.

In this embodiment, a substantially half part near the tip end and a substantially half part near the coupling portion 18 of the portion of the deployment-limiting sheet 14 drawn to the upper side of the folded airbag 12 are folded in a zigzag manner, and both of half parts are mounted on the folded airbag 12 at different front and rear positions, respectively. It is to be noted that the folding method of the deployment-limiting sheet 14 and the arrangement of the folded deployment-limiting sheet 14 are not limited thereto.

Then, the shape-retaining sheet 15 is drawn from the upper side of the folded deployment-limiting sheet 14 toward the front portion of the folded airbag 12. The tip end of the shape-retaining sheet 15 is arranged to the lower side of the folded airbag 12. The front stud bolt 16a of the pressing plate 16 is inserted through the bolt insertion hole at the tip end of the shape-retaining sheet 15. Hence, the shape-retaining sheet 15 is latched onto the stud bolt 16a.

Accordingly, the shape of the folded airbag 12 and the shape of the folded deployment-limiting sheet 14 are integrally retained by the shape-retaining sheet 15.

The inflator 13 is fitted into the recess 11a at the bottom surface of the retainer 11, and the folded airbag 12 with the shape thereof retained by the shape-retaining sheet 15 is arranged in the retainer 11, so that the pressing plate 16 is mounted on the inflator 13 from above. The stud bolts 16a are inserted through the bolt insertion holes (reference numerals omitted) in the bottom surface of the retainer 11, and nuts 19 are screwed to the stud bolts 16a from below the retainer 11. The pressing plate 16 is fixed to the bottom surface of the retainer 11, and the peripheral edge of the gas inlet of the airbag 12, the tip end of the shape-retaining sheet 15, and the inflator 13 are integrally held and fixed between the pressing plate 16 and the bottom surface of the retainer 11. Accordingly, the passenger airbag apparatus 10 shown in FIG. 1 is formed.

In the passenger airbag apparatus 10, since the shape-retaining sheet 15 configured to retain the shape of the folded airbag 12 and the shape of the folded deployment-limiting sheet 14 is provided, the folded deployment-limiting sheet 14 can be held at a predetermined folding form and at a predetermined position by the shape-retaining sheet 15. Accordingly, the folded deployment-limiting sheet 14 is prevented from being unfolded or deviated from its expected position. Thus, the deployment-limiting sheet 14 and the airbag 12 are prevented from varying in deployment form or such variation is decreased.

Next, the activation of the passenger airbag apparatus 10 is described.

When the automobile with the passenger airbag apparatus 10 collides, the inflator 13 is activated, and supplies gas into the airbag 12. With the gas from the inflator 13, the airbag 12 starts to be inflated. The airbag 12 pushes and opens the door 2 and is inflated into the cabin.

When the inflation of the airbag 12 is started, the shape of the folded airbag 12 is retained by the shape-retaining sheet 15. As the airbag 12 starts to be inflated, an inflation pressure of the airbag 12 is applied to the shape-retaining sheet 15, causing a tensile force at the shape-retaining sheet 15. When the tensile force becomes a predetermined value or higher, as shown in FIG. 3, the shape-retaining sheet 15 is torn along the expected tear portion 15a, the shape retainment of the airbag 12 is released, and the airbag 12 starts to be inflated into the cabin through the door 2.

As described above, with the passenger airbag apparatus 10, the inflation of the airbag 12 is restrained until the shape-retaining sheet 15 releases the shape retainment, and an inflation force of the airbag 12 is partly consumed by tearing the expected tear-portion 15a of the shape-retaining sheet 15. Thus, an inflation speed of the airbag 12 in an initial inflation phase is decreased.

Thereafter, the airbag 12 is inflated to the upper side to fill the space between the dashboard 1 and the windshield 4. At this time, the deployment-limiting sheet 14 is deployed to the upper side along with the inflation of the airbag 12. As shown in FIG. 4, the deployment-limiting sheet 14 extends along the rear portion of the airbag 12. Accordingly, a frictional force is applied between the deployment-limiting sheet 14 and a rear surface of the airbag 12, and a protruding speed of the airbag 12 toward the rear side, i.e., toward the passenger sheet is decreased.

As shown in FIG. 5, when an inner pressure of the airbag 12 is sufficiently increased, the rear portion of the airbag 12 is inflated to push the deployment-limiting sheet 14 and to protrude to the rear and lower sides. The inflation of the airbag 12 is thus completed.

As described above, with the passenger airbag apparatus 10, the deployment-limiting sheet 14 decreases the protruding speed of the airbag 12 toward the rear side of the vehicle body during the inflation, and also, the shape-retaining sheet 15 decreases the protruding speed of the airbag 12 from the door 2 in the initial inflation phase. Hence, when the occupant is out of position and located near the door 2 such that the occupant leans on the dashboard 1 for example, and when the airbag 12 contacts the occupant immediately after the airbag 12 starts to be inflated into the cabin through the door 2, only a small shock is applied to the occupant.

Figure 6:
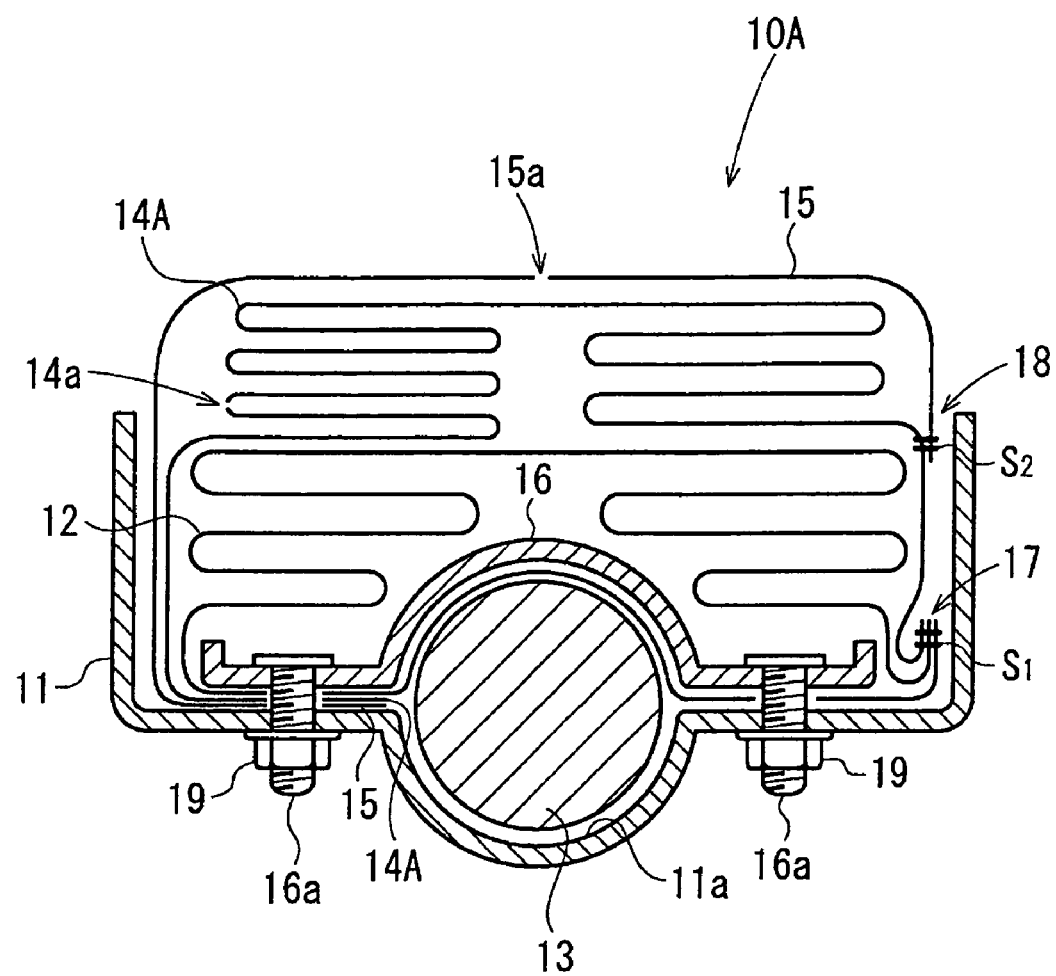
FIG. 6 is a longitudinal sectional view schematically showing a passenger airbag apparatus according to another embodiment.
Figure 7:
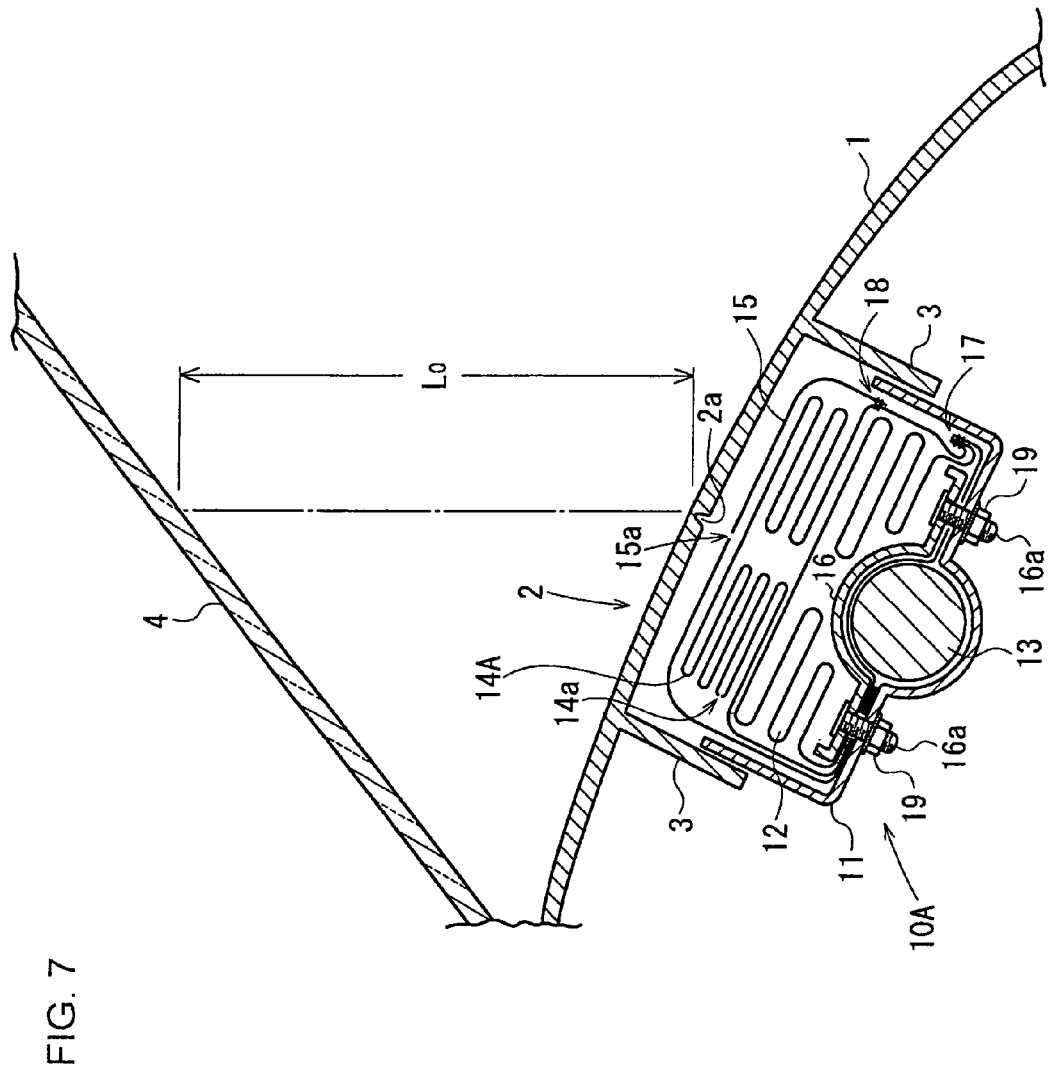
FIG. 7 is a longitudinal sectional view showing an area around an upper portion of a dashboard in a cabin, in which the passenger airbag apparatus in FIG. 6 is disposed.
Figure 8:
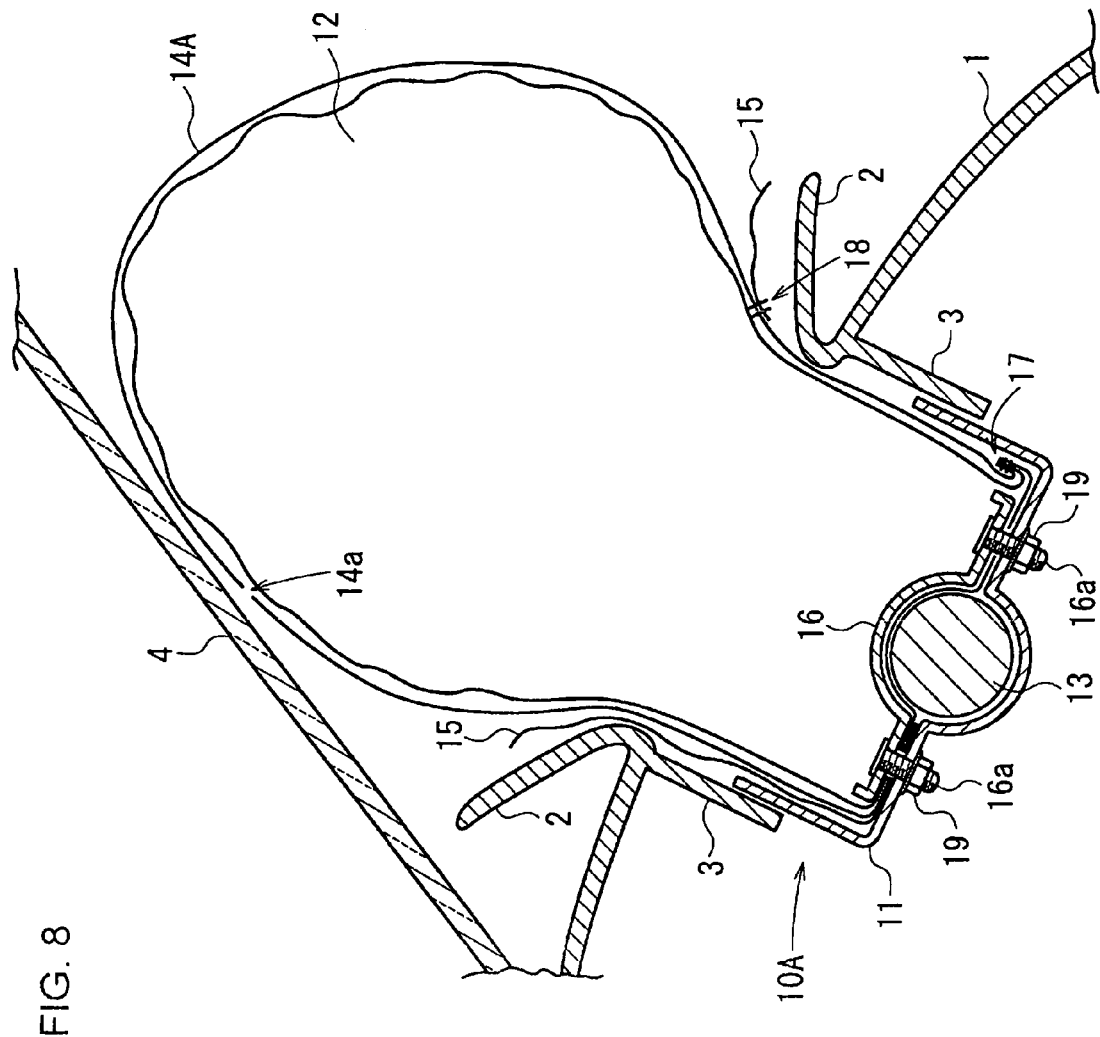
FIG. 8 is a longitudinal sectional view showing the area around the upper portion of the dashboard in the cabin, in which the passenger airbag apparatus in FIG. 6 is disposed.
Figure 9:
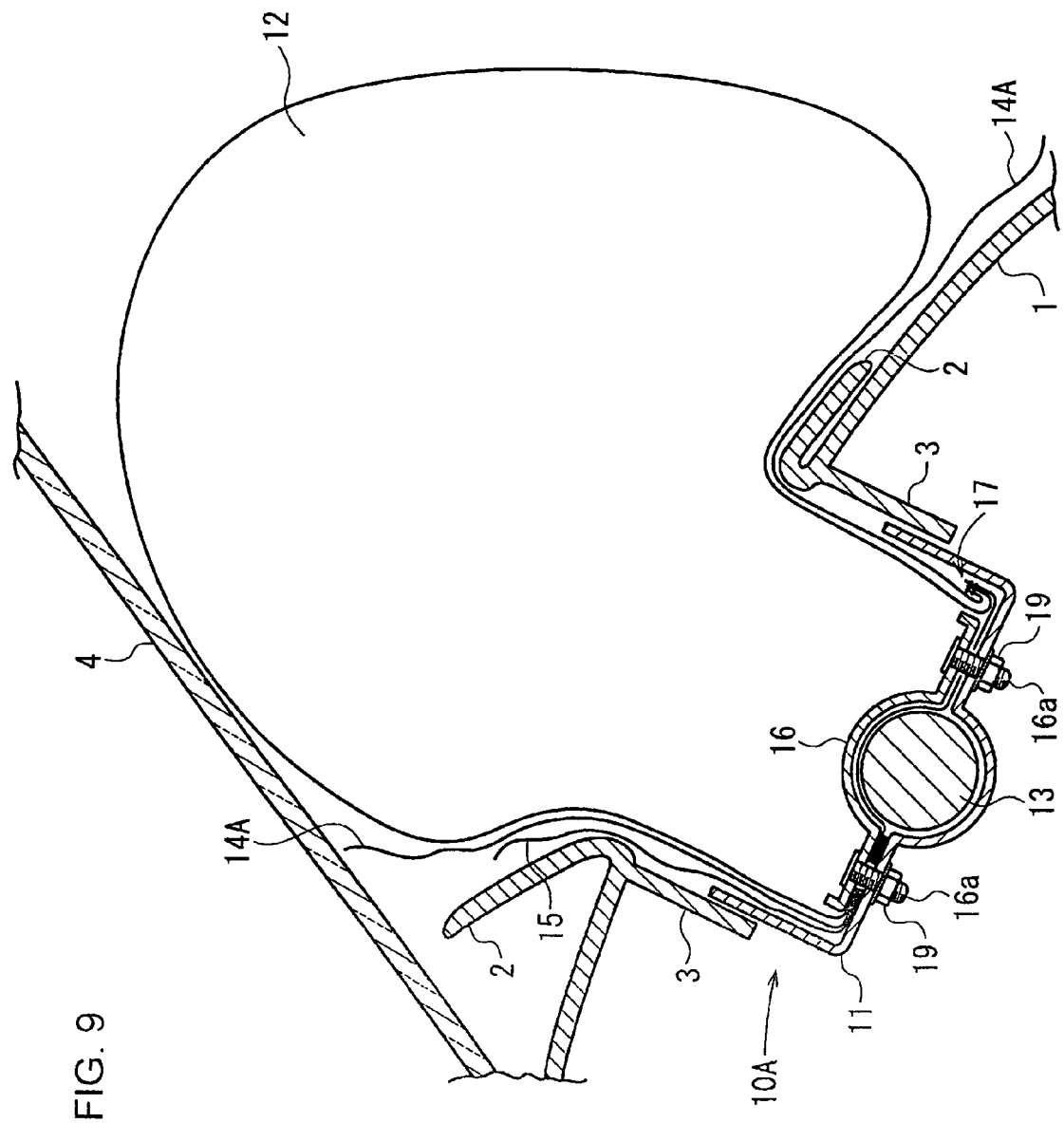
FIG. 9 is a longitudinal sectional view showing the area around the upper portion of the dashboard in the cabin, in which the passenger airbag apparatus in FIG. 6 is disposed.

FIG. 6 is a longitudinal sectional view schematically showing a passenger airbag apparatus according to another embodiment. FIGS. 7 to 9 are longitudinal sectional views, each showing an area around an upper portion of a dashboard in a cabin, the passenger airbag apparatus being disposed in the area. FIG. 7 shows a condition before inflation of an airbag, FIG. 8 shows a condition in which a deployment-limiting sheet limits deployment of the airbag during inflation, and FIG. 9 shows a condition in which the inflation of the airbag is completed.

Similarly in this embodiment, a passenger airbag apparatus 10A includes a retainer 11, which is a top-open container arranged inside a dashboard 1 in front of a passenger seat of an automobile; a folded airbag 12 arranged in the retainer 11; an inflator 13 configured to inflate the airbag 12; a deployment-limiting sheet 14A configured to limit deployment of the airbag 12 during inflation of the airbag 12; and a shape-retaining sheet 15 configured to retain the shape of the folded airbag 12.

Also in this embodiment, one end (base end) of the deployment-limiting sheet 14A is superposed on a sewing portion 17 at a rear portion of a base-end portion of the airbag 12 and is sewed thereto with a seam $S_1$. The coupling method of the one end of the deployment-limiting sheet 14A to the airbag 12 is similar to that of the former embodiment.

In this embodiment, the deployment-limiting sheet 14A extends from the rear side of the folded airbag 12 through the upper side of the folded airbag 12 toward the front side of the vehicle body. The other end (tip end) of the deployment-limiting sheet 14A extends from the front side of the folded airbag 12 to the lower side of the folded airbag 12. The other end of the deployment-limiting sheet 14A has a bolt insertion hole (reference numeral omitted). A front stud bolt 16a of a pressing plate 16 is inserted through the bolt insertion hole. Hence, the other end of the deployment-limiting sheet 14A is latched onto the stud bolt 16a.

An expected tear portion 14a is provided at a position closer to the other end with respect to a center position in its longitudinal direction of the deployment-limiting sheet 14A. In this embodiment, the expected tear portion 14a is a slit with perforations extending across the deployment-limiting sheet 14A in its width direction, in a manner similar to the expected tear portion 15a of the shape-retaining sheet 15. The deployment-limiting sheet 14C is torn along the expected tear portion 14a when a predetermined value or higher of the tensile force is applied to the deployment-limiting sheet 14A in the longitudinal direction. The deployment-limiting sheet 14A is separated into one end portion and the other end portion at the expected tear portion 14a.

A length $L_3$ (not shown) of the deployment-limiting sheet 14A from the sewing portion 17 of the deployment-limiting sheet 14A with the airbag 12 to the expected tear portion 14a is greater than a distance $L_0$ (FIG. 7) from a substantially center position of the door 2 in the front-rear direction of the vehicle body to the windshield 4 located vertically above the substantially center position.

The overall length of the deployment-limiting sheet 14A is smaller than a length of an outer periphery extending along respective surfaces at the rear side, the upper side, and the front side of the completely inflated airbag 12.

The other structure of the passenger airbag apparatus 10A in this embodiment is similar to the passenger airbag apparatus 10 shown in FIGS. 1 to 5. In FIGS. 6 to 9, numerals the same as those in FIGS. 1 to 5 refer components the same as in FIGS. 1 to 5.

A procedure from the folding to the shape retainment of the airbag 12 in this embodiment is described below.

The processes of arranging the pressing plate 16 in the airbag 12, folding the airbag 12 into a block form, and mounting the folded airbag 12 on the pressing plate 16, are similar to those in the former embodiment.

In this embodiment, after the airbag 12 is folded, the deployment-limiting sheet 14A is drawn from the rear side of the folded airbag 12 through the upper side of the folded airbag 12 toward the front side of the vehicle body. Then, the tip end of the deployment-limiting sheet 14A is arranged to the lower side of the folded airbag 12, the front stud bolt 16a of the pressing plate 16 is inserted through the bolt insertion hole at the tip end of the deployment-limiting sheet 14A, and hence the deployment-limiting sheet 14C is latched onto the stud bolt 16a.

A portion of the deployment-limiting sheet 14A drawn to the upper side of the folded airbag 12 is folded into a block form, and is mounted on the folded airbag 12.

Also in this embodiment, a substantially half part near the tip end and a substantially half part near the base end of the deployment-limiting sheet 14A drawn to the upper side of the folded airbag 12 are folded in a zigzag manner, and the parts are mounted on the folded airbag 12 at different front and rear positions. However, the folding method of the deployment-limiting sheet 14A and the arrangement of the deployment-limiting sheet 14A on the folded airbag 12 are not limited thereto.

Then, similarly to the former embodiment, the shape-retaining sheet 15 is drawn from the upper side of the folded deployment-limiting sheet 14A toward the front side of the folded airbag 12. The tip end of the shape-retaining sheet 15 is arranged to the lower side of the folded airbag 12. The front stud bolt 16a of the pressing plate 16 is inserted through the bolt insertion hole at the tip end of the shape-retaining sheet 15. Hence, the shape-retaining sheet 15 is latched onto the stud bolt 16a.

Accordingly, the shape of the folded airbag 12 and the shape of the folded deployment-limiting sheet 14A are integrally retained by the shape-retaining sheet 15.

Also in this embodiment, the inflator 13 is fitted into the recess 11a at the bottom surface of the retainer 11, and the folded airbag 12 with the shape thereof retained by the shape-retaining sheet 15 is arranged in the retainer 11, so that the pressing plate 16 is mounted on the inflator 13 from above. The stud bolts 16a are inserted through the bolt insertion holes in the bottom surface of the retainer 11, and the nuts 19 are screwed to the stud bolts 16a from below the retainer 11. The pressing plate 16 is fixed to the bottom surface of the retainer 11, and the peripheral edge of the gas inlet at the airbag 12, the tip end of the shape-retaining sheet 15, the tip end of the deployment-limiting sheet 14A, and the inflator 13 are integrally held and fixed between the pressing plate 16 and the bottom surface of the retainer 11. Accordingly, the passenger airbag apparatus 10A shown in FIG. 6 is formed.

In the passenger airbag apparatus 10A, since the shape-retaining sheet 15 configured to retain the shape of the folded airbag 12 and the shape of the folded deployment-limiting sheet 14A is provided, the folded deployment-limiting sheet 14A can be held in a predetermined folding form and at a predetermined position by the shape-retaining sheet 15. Accordingly, the folded deployment-limiting sheet 14A is prevented from being unfolded or deviated from its expected position. Thus, the deployment-limiting sheet 14A and the airbag 12 are prevented from varying in deployment form or such variation is decreased.

The passenger airbag apparatus 10A is activated as follows.

When the automobile collides, the inflator 13 is activated, and thus the airbag 12 starts to be inflated.

Also in the passenger airbag apparatus 10A, when the inflation of the airbag 12 is started, the shape of the folded airbag 12 is retained by the shape-retaining sheet 15. As the airbag 12 starts to be inflated, an inflation pressure of the airbag 12 is applied to the shape-retaining sheet 15, causing a tensile force at the shape-retaining sheet 15. When the tensile force reaches a predetermined value or higher, the shape-retaining sheet 15 is torn along an expected tear portion 15a, the shape retainment of the airbag 12 is released, and the airbag 12 starts to be inflated into the cabin through the door 2, in a manner similar to FIG. 3 of the former embodiment.

Accordingly, also in the passenger airbag apparatus 10A, the inflation of the airbag 12 is restrained until the shape-retaining sheet 15 releases the shape retainment, and the inflation force of the airbag 12 is partly consumed by tearing the expected tear portion 15a of the shape-retaining sheet 15. Thus, the inflation speed of the airbag 12 in an initial inflation phase is decreased.

Thereafter, the airbag 12 is inflated to the upper side to fill the space between the dashboard 1 and the windshield 4. The deployment-limiting sheet 14A has a loop-like shape surrounding the airbag 12. In particular, the one end of the deployment-limiting sheet 14A is coupled to the rear portion of the base-end portion of the airbag 12, and the other end of the deployment-limiting sheet 14A is coupled to a front portion of the bottom surface of the retainer 11 until the expected tear portion 14a is torn.

As described above, the overall length of the deployment-limiting sheet 14A is smaller than the length of the outer periphery of the completely inflated airbag 12. Hence, the deployment-limiting sheet 14A temporarily restrains the inflation of the airbag 12 until the inflation of the airbag 12 reaches a condition in which the deployment-limiting sheet 14A achieves a maximum deployment form, i.e., in which the deployment-limiting sheet 14A becomes superposed on the outer surface of the airbag 12 and is tensed. Then, when the tensile force produced at the deployment-limiting sheet 14A by an inflation pressure of the airbag 12 becomes a predetermined value or higher, as shown in FIG. 9, the expected tear portion 14a is torn, the restraint by the deployment-limiting sheet 14A is released, and the airbag 12 is inflated to a maximum inflation form.

One end of a rear remaining piece produced when the deployment-limiting sheet 14A is torn is coupled to the base-end portion of the airbag 12, and the other end thereof is a free end. In a later inflation phase of the airbag 12, and the rear remaining piece extends along the rear portion of the airbag 12, thereby providing a similar function to that of the deployment-limiting sheet 14 in the former embodiment.

In particular, a frictional force is produced between the rear remaining piece of the torn deployment-limiting sheet 14A and the rear portion of the airbag 12. Accordingly, a protruding speed of the airbag 12 toward the rear side of the airbag 12, i.e., toward the passenger seat is decreased Since the expected tear portion 14a is arranged near the other end with respect to a center position in the longitudinal direction, i.e., near a front end portion of the deployment-limiting sheet 14A, a front remaining piece produced when the expected tear portion 14a is torn has a length smaller than the length of the rear remaining piece. Thus, the frictional force produced between the front remaining piece of the deployment-limiting sheet 14A and the front portion of the airbag 12 becomes smaller than that at the rear side of the vehicle body. Hence, the front portion of the airbag 12 is inflated faster than the rear portion.

As described above, in the passenger airbag apparatus 10A, the deployment-limiting sheet 14A temporarily restrains the inflation of the airbag 12 when the airbag 12 starts to be inflated through the door 2. Further, after the restraint is released, the rear remaining piece of the deployment-limiting sheet 14A limits the inflation of the rear portion of the airbag 12. Accordingly, the protruding speed of the airbag 12 toward the rear side of the vehicle body is efficiently decreased.

Figure 10:
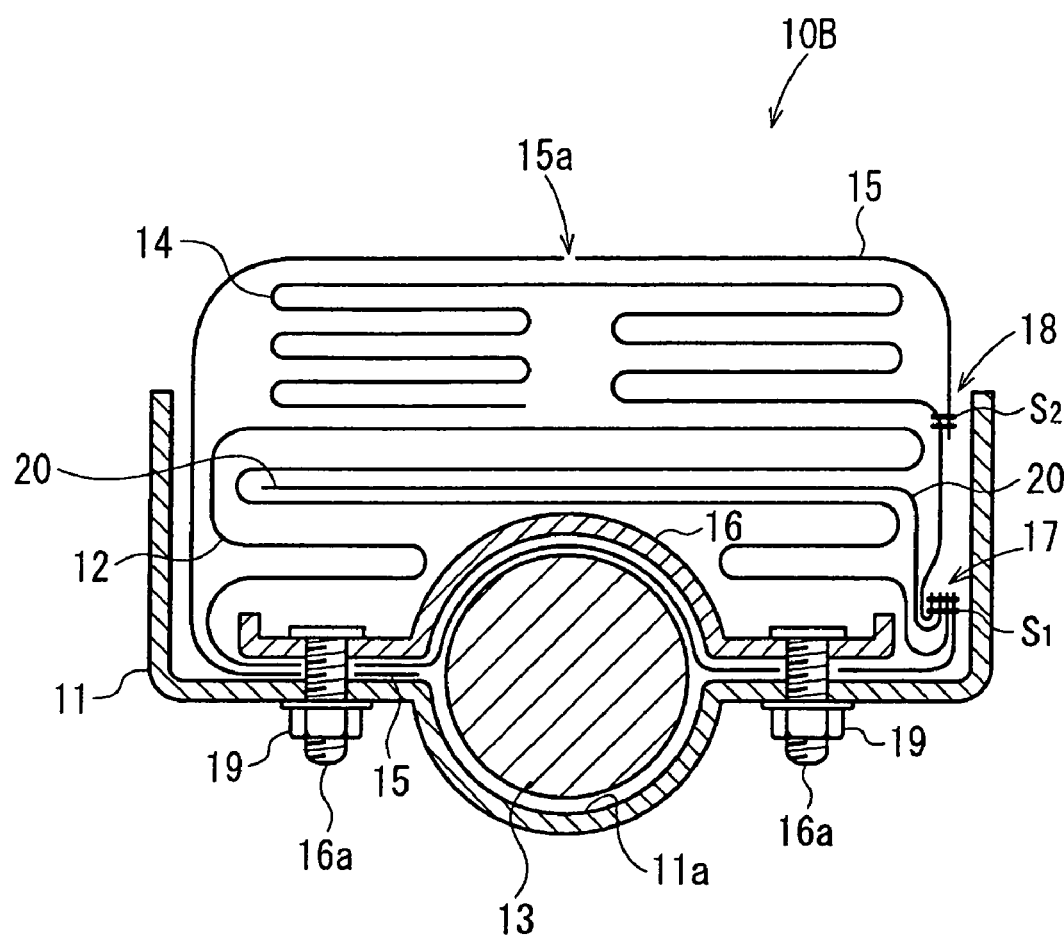
FIG. 10 is a longitudinal sectional view schematically showing a passenger airbag apparatus according to still another embodiment.
Figure 11:
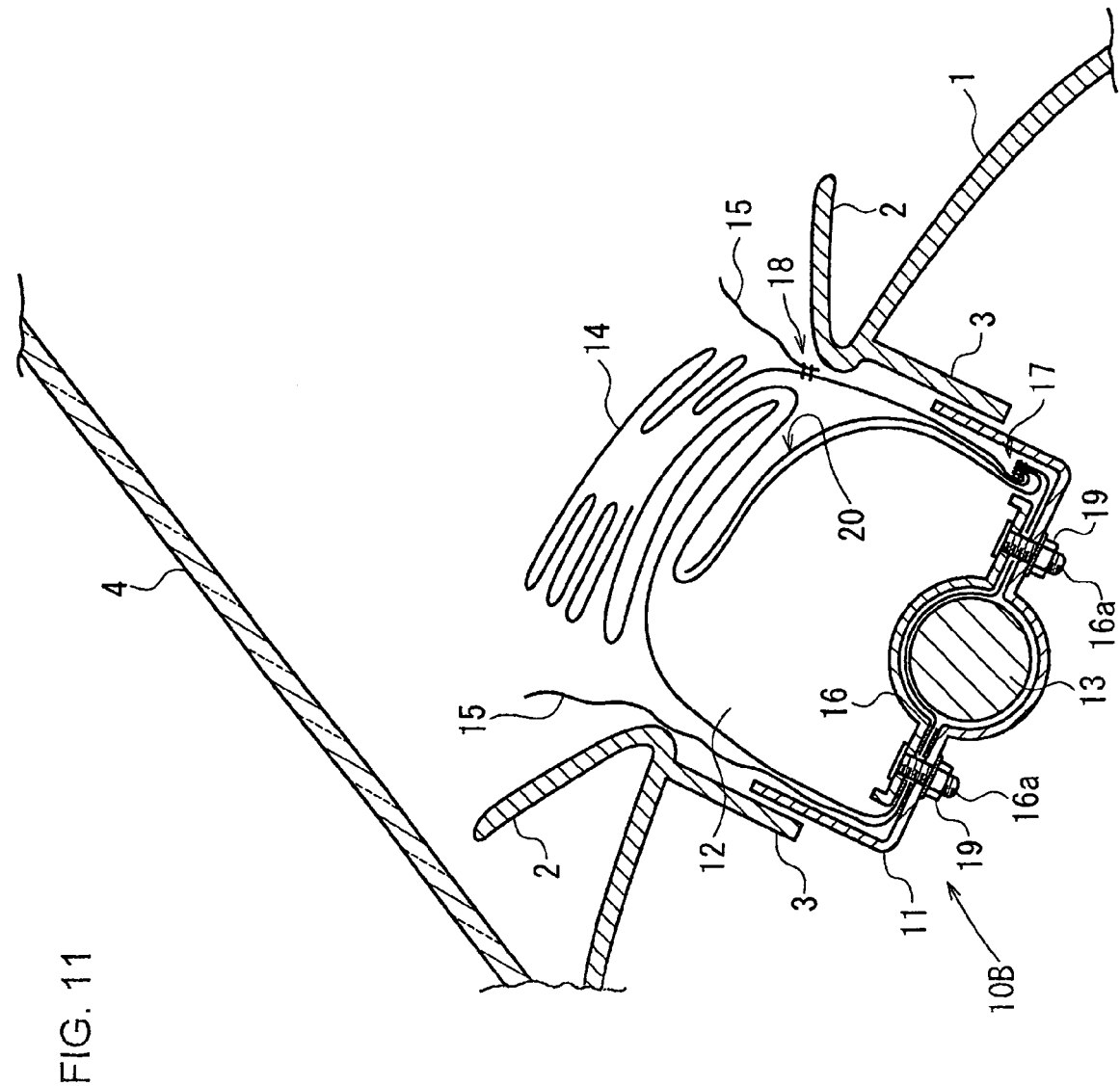
FIG. 11 is a longitudinal sectional view showing an area around an upper portion of a dashboard in a cabin, in which the passenger airbag apparatus in FIG. 10 is disposed.
Figure 12:
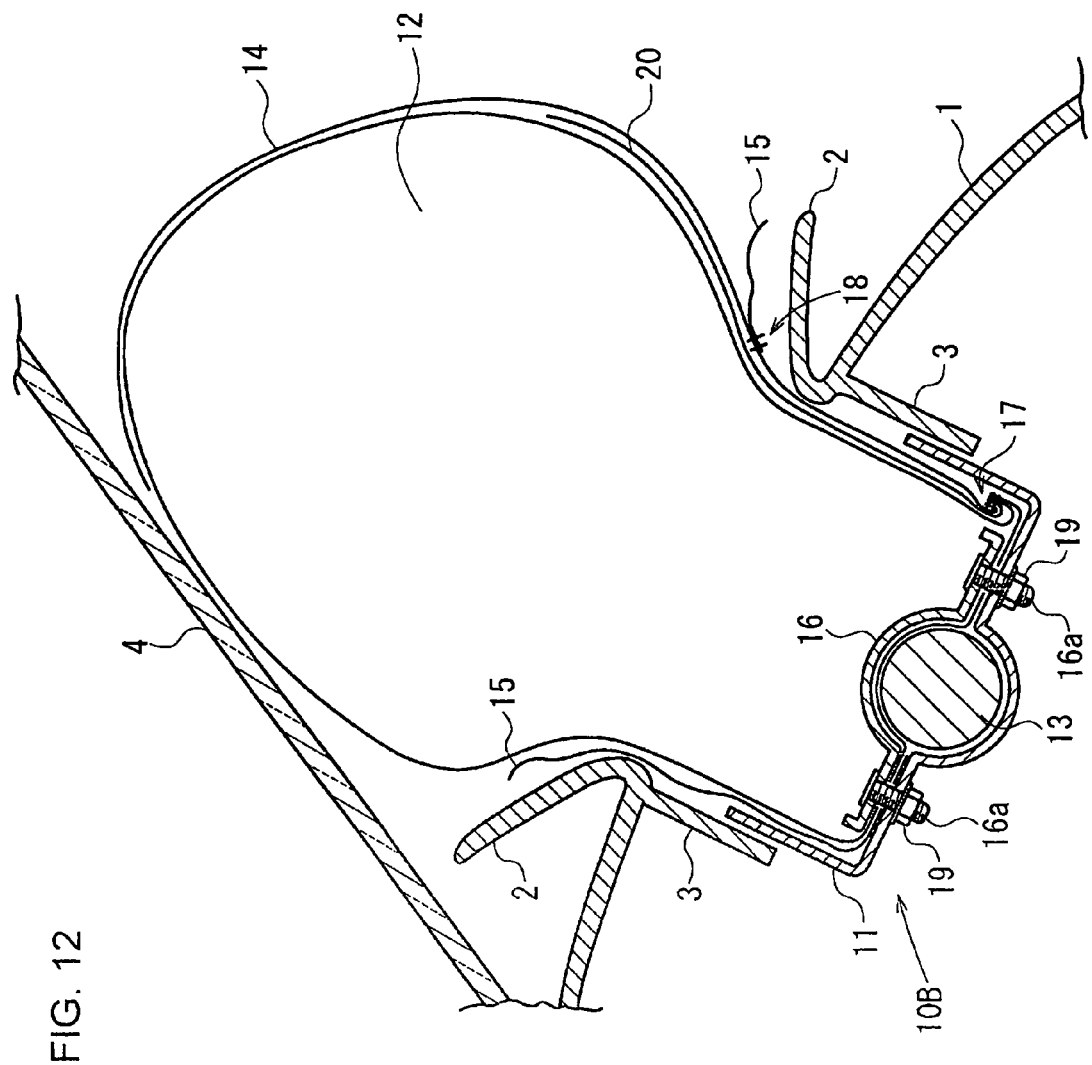
FIG. 12 is a longitudinal sectional view showing the area around the upper portion of the dashboard in the cabin, in which the passenger airbag apparatus in FIG. 10 is disposed.

FIG. 10 is a longitudinal sectional view schematically showing a passenger airbag apparatus according to still another embodiment. FIGS. 11 and 12 are longitudinal sectional views, each showing an area around an upper portion of a dashboard in a cabin, the passenger airbag apparatus being disposed in the area. FIG. 11 shows a condition immediately after inflation of an airbag is started, and FIG. 12 shows a condition in which a deployment-limiting sheet limits deployment of the airbag during inflation.

A passenger airbag apparatus 10B in this embodiment includes a retainer 11, which is a top-open container arranged inside a dashboard 1 in front of a passenger seat of an automobile; a folded airbag 12 arranged in the retainer 11; an inflator 13 configured to inflate the airbag 12; a deployment-limiting sheet 14 configured to limit deployment of the airbag 12 during the inflation of the airbag 12; a shape-retaining sheet 15 configured to retain the shape of the folded airbag 12; and a second deployment-limiting sheet 20 configured to decrease a protruding speed of the airbag 12 from the retainer 11.

In this embodiment, the second deployment-limiting sheet 20 is a strip-shaped sheet having a predetermined length, which is provided separately from the deployment-limiting sheet 14. The second deployment-limiting sheet 20 is arranged near the airbag 12 with respect to the deployment-limiting sheet 14, the longitudinal direction of the second deployment-limiting sheet 20 being parallel to the deployment-limiting sheet 14. One end (hereinafter, also referred to as a base end) of the second deployment-limiting sheet 20 is coupled to the deployment-limiting sheet 14.

In this embodiment, the one end of the second deployment-limiting sheet 20 is superposed on a sewing portion 17 at a rear portion of a base-end portion of the airbag 12 and is sewed thereto with a seam $S_1$, together with the one end (base end) of the deployment-limiting sheet 14.

The length of the second deployment-limiting sheet 20 may be preferably in a range from 100 to 350 mm, and more particularly, in a range from 150 to 250 mm. Also, the width of the second deployment-limiting sheet may be preferably substantially equivalent to the width in the vehicle-body-width direction of the opening at the upper surface of the retainer 11. In this embodiment, the length of the second deployment-limiting sheet 20 is substantially equivalent to the width of the folded airbag 12 in the front-rear direction. Also, in this embodiment, the width of the second deployment-limiting sheet 20 is substantially equivalent to the width of the folded airbag 12 in the vehicle-body-width direction. The dimensions of the second deployment-limiting sheet 20, however, are not limited thereto.

The second deployment-limiting sheet 20 may be tucked into the folded airbag 12 when the airbag 12 is to be folded by superposing the second deployment-limiting sheet 20 on a rear surface of the airbag 12 and integrally folding it with the airbag 12. Alternatively, after the airbag 12 is folded, the second deployment-limiting sheet 20 may be inserted into a space between folded parts of the folded airbag 12 from the rear side of the vehicle body.

The other structure of the passenger airbag apparatus 10B in this embodiment is similar to that of the passenger airbag apparatus 10 shown in FIGS. 1 to 5. In FIGS. 10 to 12, numerals the same as those in FIGS. 1 to 5 refer components the same as in FIGS. 1 to 5.

Also, the procedure from folding to the shape retainment of the airbag 12 in this embodiment is similar to that in the embodiment shown in FIGS. 1 to 5 except that the second deployment-limiting sheet 20 is tucked into the folded airbag 12.

The passenger airbag apparatus 10B is activated as follows.

When the automobile collides, the inflator 13 is activated, and thus the airbag 12 starts to be inflated.

Also in the passenger airbag apparatus 10B, when the inflation of the airbag 12 is started, the shape of the folded airbag 12 is retained by the shape-retaining sheet 15. As the airbag 12 starts to be inflated, an inflation pressure of the airbag 12 is applied to the shape-retaining sheet 15, causing a tensile force at the shape-retaining sheet 15. When the tensile force reaches a predetermined value or higher, the shape-retaining sheet 15 is torn along the expected tear portion 15a, the shape retainment of the airbag 12 is released, and the airbag 12 starts to be inflated into the cabin through the door 2.

At this time, since the second deployment-limiting sheet 20 is tucked into the folded airbag 12, as shown in FIG. 11, a frictional force is produced between the second deployment-limiting sheet 20 and the outer surface of the airbag 12. Hence, the frictional force decreases the inflation speed of the airbag 12.

Thereafter, the airbag 12 is inflated to the upper side to fill the space between the dashboard 1 and the windshield 4. At this time, as shown in FIG. 12, similarly to any of the above-described embodiments, since the deployment-limiting sheet 14 extends along the rear portion of the airbag 12, the frictional force is applied between the deployment-limiting sheet 14 and the rear surface of the airbag 12. The rear portion of the airbag 12 is inflated at a delayed timing. Accordingly, the protruding speed of the airbag 12 toward the rear side, i.e., toward the passenger seat is decreased.

Also as shown in FIG. 5, when an inner pressure of the airbag 12 is sufficiently increased, the rear portion of the airbag 12 is inflated to push the deployment-limiting sheet 14 and further to protrude to the rear and lower sides. The inflation of the airbag 12 is thus completed.

As described above, in the passenger airbag apparatus 10B, the inflation of the airbag 12 is restrained until the shape-retaining sheet 15 releases the shape retainment, and the inflation force of the airbag 12 is partly consumed by tearing the expected tear portion 15a of the shape-retaining sheet 15. Thus, the inflation speed of the airbag 12 in the initial inflation phase is decreased, and even after the shape retainment is released, the frictional force applied between the second deployment-limiting sheet 20 and the airbag 12 decreases the inflation speed of the airbag 12. Accordingly, the protruding speed of the airbag 12 from the door 2 is efficiently decreased.

While the passenger airbag apparatus 10B is configured such that the second deployment-limiting sheet 20 is provided in the passenger airbag apparatus 10 shown in FIGS. 1 to 5, a second deployment-limiting sheet 20 may be similarly provided in the passenger airbag apparatus 10A shown in FIGS. 6 to 9.

In this embodiment, while the length of the second deployment-limiting sheet 20 is substantially equivalent to the width of the folded airbag 12 in the front-rear direction, the length of the second deployment-limiting sheet 20 may be greater than the width of the folded airbag 12 in the front-rear direction. In this case, the second deployment-limiting sheet 20 may be integrally folded with the airbag 12, or may be folded independently from the airbag 12 and the folded second deployment-limiting sheet 20 may be inserted into a space between folded parts of the folded airbag 12.

In this embodiment, while the second deployment-limiting sheet 20 is coupled to the rear portion of the base-end portion of the airbag 12 together with the deployment-limiting sheet 14, the second deployment-limiting sheet 20 may be coupled to a rear portion of the retainer 11. Alternatively, the second deployment-limiting sheet 20 may be coupled to a middle portion in the longitudinal direction of the deployment-limiting sheet 14.

Figure 13:
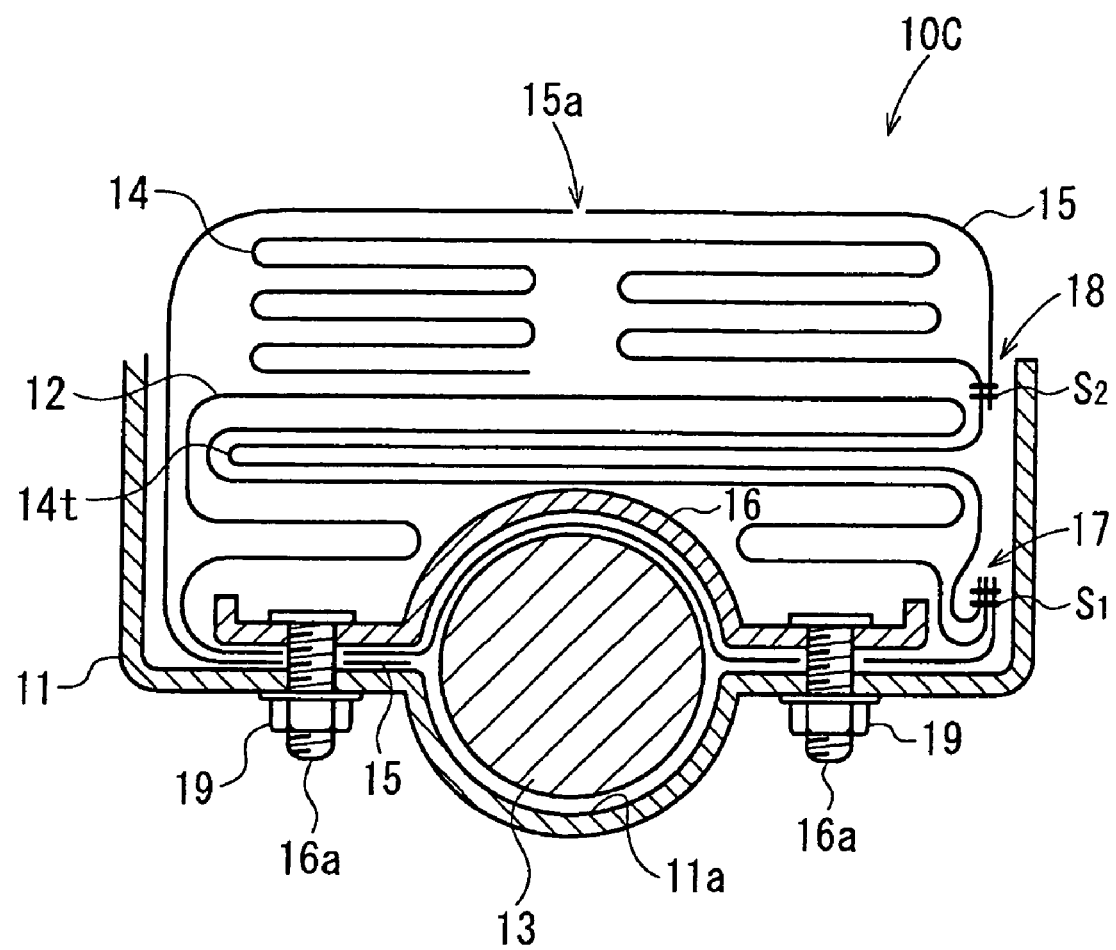
FIG. 13 is a longitudinal sectional view schematically showing a passenger airbag apparatus according to yet another embodiment.

In this embodiment, while the second deployment-limiting sheet 20 is provided separately from the deployment-limiting sheet 14, the second deployment-limiting sheet 20 may be integrally provided with the deployment-limiting sheet 14. Alternatively, instead of providing the second deployment-limiting sheet 20, a part of the deployment-limiting sheet 14 may be tucked into the folded airbag 12. FIG. 13 is a longitudinal sectional view schematically showing a passenger airbag apparatus 10C thusly configured.

In the passenger airbag apparatus 10C shown in FIG. 13, a base end of a deployment-limiting sheet 14 is partly pulled toward the front side of the vehicle body, thereby forming a folded pulled portion 14t. The pulled portion 14t is tucked into the folded airbag 12 from the rear side of the vehicle body. The pulled portion 14t may be tucked into the folded airbag 12 when the airbag 12 is to be folded by superposing the pulled portion 14t on a rear portion of the airbag 12 and integrally folding it with the airbag 12. Alternatively, after the airbag 12 is folded, the pulled portion 14t may be inserted into a space between folded parts of the folded airbag 12 from the rear side of the vehicle body. The other structure of the passenger airbag apparatus 10C is similar to that of the passenger airbag apparatus 10 shown in FIGS. 1 to 5. In FIG. 13, numerals the same as those in FIGS. 1 to 5 refer components the same as in FIGS. 1 to 5.

Also in the passenger airbag apparatus 10C, when the airbag 12 is inflated, even after the shape retainment by the shape-retaining sheet 15 is released, a frictional force is produced between the pulled portion 14t of the deployment-limiting sheet 14 tucked into the folded airbag 12 and the outer surface of the airbag 12. Thus, the frictional force decreases an inflation speed of the airbag 12. That is, in the passenger airbag apparatus 10C, the pulled portion 14t functions as a second deployment-limiting sheet.

In the passenger airbag apparatus 10C, it is not necessary to couple a second deployment-limiting sheet to the airbag 12, the deployment-limiting sheet 14, or the retainer.

In this embodiment, the pulled portion 14t is formed at the middle portion of the deployment-limiting sheet 14 in the passenger airbag apparatus 10 shown in FIGS. 1 to 5 and the pulled portion 14t is tucked into the folded airbag 12. Alternatively, a pulled portion 14t may be formed in the embodiment shown in FIGS. 6 to 9 by partly pulling a deployment-limiting sheet 14A similarly, and the pulled portion 14t may be tucked into a folded airbag 12.

In the above-described embodiments, the substantially half part near the front side of the vehicle body and the substantially half part near the rear side of the vehicle body of the deployment-limiting sheet 14 or the deployment-limiting sheet 14A drawn to the upper side of the folded airbag 12 are folded in a zigzag manner, and both of the half parts are mounted on the folded airbag 12 at different front and rear positions, respectively. However, the folding method of the deployment-limiting sheet 14 or 14A is not limited thereto, and the airbag 12 may be folded by a folding method other than the zigzag folding. For example, the deployment-limiting sheet 14 or 14A may be rolled, or by a combination of a plurality of folding methods. Also, the arrangement of the folded deployment-limiting sheet 14 or 14A is not limited thereto.

Figure 14:
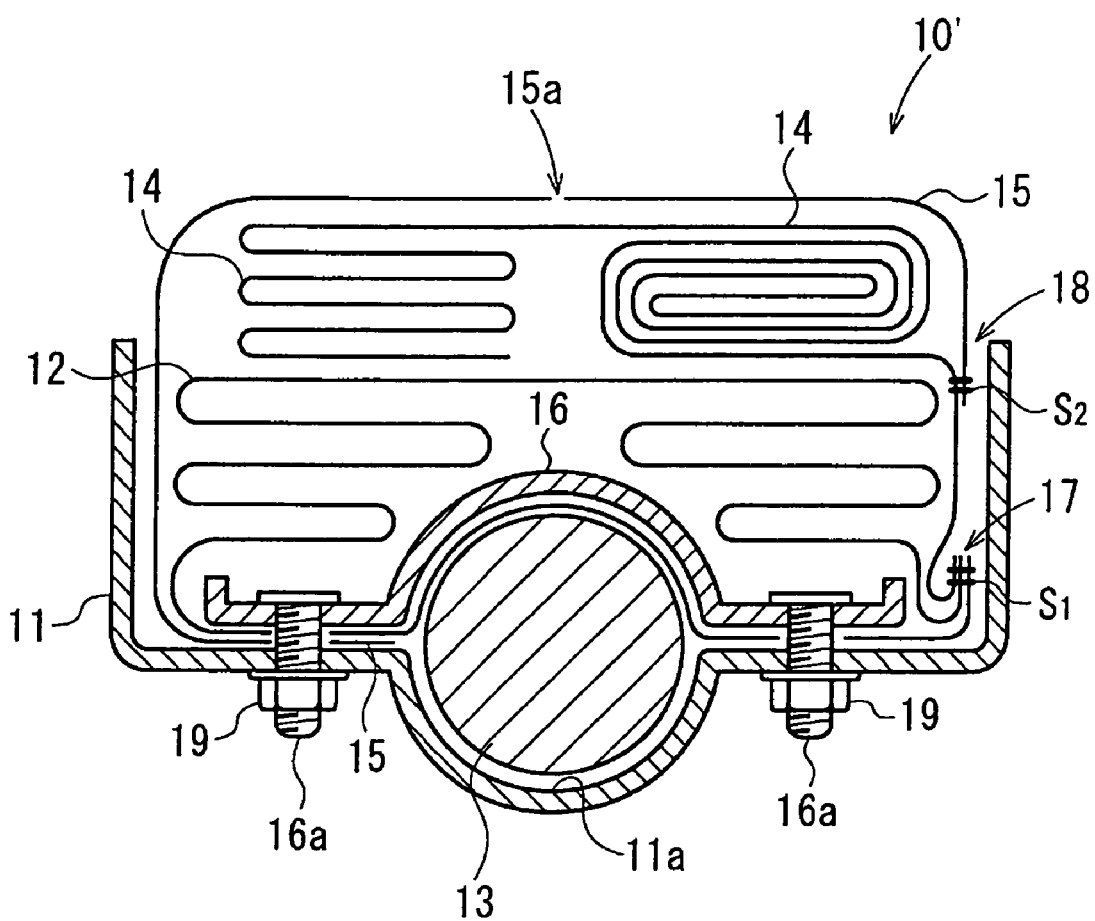
FIG. 14 is a vertical sectional view schematically showing a passenger airbag apparatus and another folding method of a deployment-limiting sheet.

FIG. 14 shows another exemplary folding method of a deployment-limiting sheet.

In a passenger airbag apparatus 10 shown in FIG. 14, a substantially half part, near the front side of the vehicle body, of a deployment-limiting sheet 14 drawn to the upper side of a folded airbag 12 is folded in a zigzag manner, and a substantially half part near the rear side of the vehicle body is rolled. Alternatively, the front portion of the deployment-limiting sheet 14 may be rolled, and the rear portion of the deployment-limiting sheet 14 may be folded in a zigzag manner. Still alternatively, both of the front and rear portions may be rolled. Yet alternatively, the front and rear portions of the deployment-limiting sheet 14 may be partly rolled and remaining parts may be folded in a zigzag manner. Of course, the deployment-limiting sheet 14 may be folded by any other folding method.

While FIG. 14 shows an example of the folding method of the deployment-limiting sheet 14, the deployment-limiting sheet 14A shown in FIG. 6 may be folded by a folding method other than the illustrated method.

The above-described embodiments merely show examples of the present invention. Therefore, the present invention is not limited to the illustrated configurations.

For example, in the above-described embodiments, while the one end (base end) of any of the deployment-limiting sheet 14, 14A is coupled to the rear portion of the base-end portion of the airbag 12, the one end may be coupled to the rear portion of the retainer 11.

The disclosure of Japanese Patent Application No. 2008-143016 filed on May 30, 2008 is incorporated as a reference.

While the invention has been explained with reference to the specific embodiments of the invention, the explanation is illustrative and the invention is limited only by the appended claims.

What is claimed is:

1. A passenger airbag apparatus for a vehicle, comprising:
a retainer;
an airbag having front and rear portions in a front-rear direction of the vehicle, said airbag being folded and retained in the retainer;
a deployment-limiting sheet having one end coupled to a rear portion of the airbag at a first location spaced from the retainer, and extending toward the front portion of the airbag while being superposed on the airbag, said deployment-limiting sheet having a first folded part and extending along the rear portion of the airbag during inflation of the airbag; and
a first shape-retaining sheet having a first end coupled to a front portion of the retainer and a second end coupled to the deployment-limiting sheet at a second location spaced from the retainer and the first location, the first shape-retaining sheet retaining a shape of the folded airbag and a shape of the deployment-limiting sheet, said first shape-retaining sheet having a shape-retainment release portion for releasing a shape of the folded airbag by inflation of the airbag.

2. The passenger airbag apparatus according to claim 1, wherein the shape-retainment release portion is a tear line for allowing the first shape-retaining sheet to be torn when a tensile force applied to the first shape-retaining sheet becomes a predetermined value or higher.

3. The passenger airbag apparatus according to claim 1, wherein the deployment-limiting sheet has a front end coupled to a front portion of the retainer, and a deployment-limiting sheet tear line provided near the front end of the deployment-limiting sheet for allowing the deployment-limiting sheet to be torn by a tensile force produced at the deployment-limiting sheet after the deployment-limiting sheet achieves a maximum deployment form.

4. The passenger airbag apparatus according to claim 1, further comprising a second deployment-limiting sheet having a base end coupled to the first location of said deployment-limiting sheet, and a tip end tucked into the airbag.

5. The passenger airbag apparatus according to claim 1, wherein the first folded part of the deployment-limiting sheet is located above the folded airbag, and includes first and second folded portions folded separately and integrated with each other at a middle portion thereof.

6. The passenger airbag apparatus according to claim 5, wherein the deployment-limiting sheet has a front end connected to a front portion of the retainer so that the deployment-limiting sheet completely covers the folded airbag, and a deployment-limiting sheet tear line which tears upon inflation of the airbag.

7. The passenger airbag apparatus according to claim 5, wherein the deployment-limiting sheet has a second folded part located between the first folded part and the first location thereof, and tucked into the airbag.

8. The passenger airbag apparatus according to claim 1, further comprising an inflator for inflating the airbag, and a lid member for covering the retainer, said deployment-limiting sheet being interposed between the airbag and the lid member.

9. The passenger airbag apparatus according to claim 1, wherein the front portion of the airbag is coupled to a front portion of the retainer and the rear portion of the airbag is coupled to a rear portion of the retainer.

10. The passenger airbag apparatus according to claim 1, wherein the deployment-limiting sheet has a front end coupled to the front portion of the retainer.

11. The passenger airbag apparatus according to claim 1, wherein:

the retainer is disposed in a dashboard proximate a windshield;

a door is defined by a portion of a top panel of the dashboard covering the retainer;

a groove in the door defines a door tear line whereby the door is configured to be cleaved by an inflation pressure of the airbag and open to a cabin when the airbag is inflated; and a length of the deployment-limiting sheet from the coupling of the deployment-limiting sheet with the airbag at the first location, to a deployment-limiting sheet tear line, is greater than a distance $L_0$, wherein the distance $L_0$ is a distance from a substantially center position of the door to the windshield located vertically above the substantially center position.

* * * * *